United States Patent
Radominski et al.

(10) Patent No.: US 7,426,072 B2
(45) Date of Patent: Sep. 16, 2008

(54) DISPLAY SYSTEM

(75) Inventors: George Radominski, Corvallis, OR (US); Timothy R Emery, Corvallis, OR (US); Robert W. Shreeve, Pullman, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 180 days.

(21) Appl. No.: 11/258,541

(22) Filed: Oct. 25, 2005

(65) Prior Publication Data

US 2007/0091483 A1 Apr. 26, 2007

(51) Int. Cl.
- G02B 26/00 (2006.01)
- G03B 21/00 (2006.01)
- G09G 3/34 (2006.01)
- G02F 1/00 (2006.01)

(52) U.S. Cl. .................. 359/290; 353/31; 345/108; 348/771

(58) Field of Classification Search ......... 359/223–225, 359/290–292, 295, 298, 316, 453, 445–456, 359/460, 846; 353/30–31; 345/108–109; 348/740, 770–772

See application file for complete search history.

(56) References Cited

U.S. PATENT DOCUMENTS

| | | | | |
|---|---|---|---|---|
| 5,585,691 A | * | 12/1996 | Washburn | 313/452 |
| 5,835,256 A | | 11/1998 | Huibers | |
| 5,926,309 A | * | 7/1999 | Little | 359/293 |
| 5,933,277 A | * | 8/1999 | Troxell et al. | 359/573 |
| 5,991,079 A | * | 11/1999 | Furlani et al. | 359/573 |
| 6,031,657 A | * | 2/2000 | Robinson et al. | 359/293 |
| 6,567,134 B1 | * | 5/2003 | Morgan | 348/743 |
| 6,778,315 B2 | | 8/2004 | Guo et al. | |
| 6,819,470 B2 | | 11/2004 | Meier et al. | |
| 2003/0161027 A1 | | 8/2003 | Kurosawa et al. | |
| 2004/0190108 A1 | | 9/2004 | Yeh et al. | |
| 2004/0240033 A1 | * | 12/2004 | Pan et al. | 359/291 |
| 2005/0088721 A1 | | 4/2005 | Richards et al. | |

* cited by examiner

*Primary Examiner*—Scott J. Sugarman
*Assistant Examiner*—Dawayne A Pinkney

(57) ABSTRACT

One embodiment of a display system includes an array that defines multiple, movable reflective devices on a front surface of the array, and multiple immovable reflective regions each aligned along a projection axis with a corresponding space between ones of the reflective devices.

17 Claims, 1 Drawing Sheet

DISPLAY SYSTEM

BACKGROUND

Display devices may include projection type devices, such as an optical modulator. The modulator may include a plurality of micromirrors wherein each micromirror may correspond to a pixel or a sub-pixel of the modulator. A modulator may function by reflecting light in accordance with the position of each of its pixels or sub-pixels. In order to reduce unwanted reflected light from the modulator, and/or to improve the contrast ratio of a projected image, areas between each pixel may be blackened. The blackened area may reduce undesirable reflection from the modulator but may result in undesirable heating of the modulator.

DETAILED DESCRIPTION OF THE DRAWINGS

Figure 1:
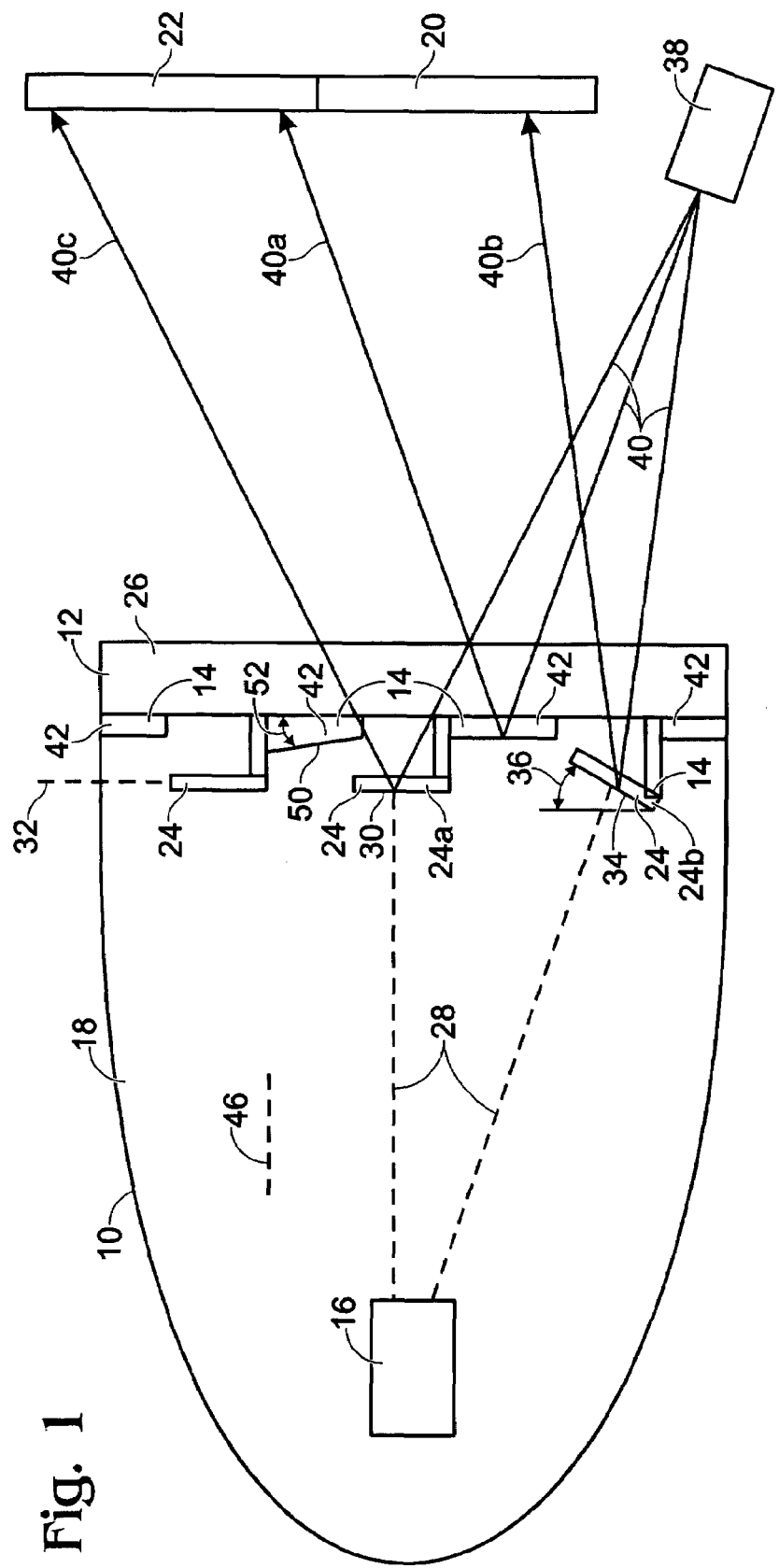
FIG. 1 is a schematic cross-sectional side view of one embodiment of a display system including a micromirror array and heat shield sections.

FIG. 1 is a schematic cross-sectional side view of one embodiment of a display system 10 including an optical modulator, such as a micromirror array 12, including a heat shield having a plurality of heat shield sections 14, and an activation device 16 housed within a housing 18. Display system 10 may further comprise a viewing region 20 and a light dump 22. Display system 10 may be a television, a digital camera, a digital projector, a monitor, an electronic device display screen, or the like. Array 12 may include an exemplary set of movable micromirrors 24 movably mounted on a support base 26 and adapted to move between a first or "off" position 24a and a second or "on" position 24b. In the illustrated embodiment, three micromirrors 24 are shown for ease of illustration. However, in other embodiments, an array of hundreds, thousands, or more, of movable mirrors 24 may be mounted on base 26 of display system 10. While system 10 in the illustrated embodiment is an optical device, it will be understood by those skilled in the art that the invention is not limited to optical devices.

Support base 26 may be manufactured of any suitable material, and in the embodiment shown, may be manufactured of a silicon based material, such as transparent glass. Mirrors 24 may be manufactured of any reflective material, and in one exemplary embodiment, may be manufactured of an aluminum coating formed on a rigid plate, such as by deposition techniques. Heat shield sections 14 may also be manufactured of a reflective material positioned between each of mirrors 24 on support base 26.

Activation device 16 may be an electron beam generator that may generate an electron beam 28 directed toward support base 26 with movable mirrors 24 and heat shield sections 14 mounted thereon. Housing 18 may define a vacuum therein such that electron beam generator 16, electron beam 28 and movable mirrors 24 are all housed within a vacuum. In one embodiment, electron beam generator 16 may sweep beam 28 sequentially across each of mirrors 24 to control the position of the mirrors, such as moving the mirrors between first position 24a and second 24b position. In first position 24a, a mirror may be positioned with its reflective surface 30 positioned parallel to a plane 32. In second position 24b, a mirror may be positioned with its reflective surface 34 positioned at an angle 36 with respect to plane 32, wherein angle 36 may be in a range of 6 to 24 degrees, for example. In other embodiments, the "off" position may be angled and the on position may be parallel with respect to plane 32, or both the on and the off positions may be angled with respect to plane 32. Heat shield sections 14 may be immovable sections and, therefore, may not be activated by electron beam 28.

Display device 10 may further include a light source 38 that may produce a light beam 40 directed toward heat shield sections 14 and movable mirrors 24 mounted on support base 26. In the embodiment shown, light source 38 is positioned outside housing 18. In other embodiments, light source 38 may be positioned inside housing 18. Light source 38 may generate light beam 40 having a wavelength in a range of 400 to 700 nm, for example, or any wavelength in the visible light range. However, any suitable type of light may be generated by an appropriate light source as may be utilized for a particular application.

Each of movable mirrors 24 on support base 26 may define a margin or immovable region 42 of array 12 between each of mirrors 24. In an absence of heat shield sections 14, light impinging on immovable regions 42 between the mirrors may tend to heat support base 26 and the micromirror array. Accordingly, the presence of heat shield sections 14 may be desirable to deflect light from heating immovable regions 42.

Heat shield sections 14 may each be described as non-transparent or non-conductive, such as including a reflective structure, formed on unreflective regions 42 of array 12, as viewed along axis 46 positioned perpendicular to plane 32. Heat shield sections 14 may be formed on or integral with support base 26 by any known process. In one embodiment, heat shield sections 14 are formed of a reflective material, such as an aluminum film, by deposition techniques. In one exemplary embodiment, heat shield sections 14 are formed by CVD or PVD metal or dielectric deposition processes which may be common in integrated circuit fabrication, for example, an aluminum film formed on a dielectric substrate. The deposition materials utilized may include a dielectric mirror material or any type of metal or reflective material such as aluminum or gold. The temperature of the process may be in a range of 100 to 200 degrees Celsius, for example. The pressure of the process may be any suitable pressure, such as a pressure suitable for formation of a plasma, and may be in a range of a vacuum to atmospheric pressure. Of course, any formation process for forming heat shield sections 14, such as a reflective region or structure between each of mirrors 24, may be utilized.

Heat shield sections 14 may define a front surface 50 that may be parallel to, or may define an angle 52 with respect to plane 32, such that front surfaces 50 of heat shield sections 14 will direct light 40a impinging on front surfaces 50 to light dump 22. (For ease of illustration, only one of heat shield sections 14 is shown angled at an angle 52 other than zero degrees with respect to plane 32). Angle 52 may be any angle, and in one embodiment may be zero degrees. In other embodiments front surface 50 may be positioned at any angle 52 as desired, such as an angle in a range of zero degrees to thirty five degrees, with respect to plane 32. In still other embodiments, each of individual heat shield sections 14 may define its own unique angle 52 so as to efficiently direct undesirable light to light dump 22. In one embodiment front surface 50 is positioned parallel to plane 32 because a flat film may be more easily formed than a film having an angled front surface.

In operation of one exemplary embodiment, display device 10 may function as follows. Electron beam generator 16 may scan array 12 to activate individual ones of movable mirrors 24 to the on/activated state and other individual ones of movable mirrors 24 to the off/unactivated state, such that the activated mirrors 24b may be angled at angle 36 with respect to plane 32, and such that the unactivated mirrors 24a may be positioned parallel to plane 32. Light beam 40 is directed toward heat shield sections 14 and mirrors 24 of micromirror array 12. Light 40b that impinges on activated mirrors 24b will be directed toward imaging region 20 and light 40c that impinges on unactivated mirrors 24a will be directed toward light dump 22. The portion 40a of light beam 40 that is directed toward heat shield sections 14 will be reflected to light dump 22. The light 40b received by imaging region 20 may form an image thereon that may be projected to or viewed directly by a viewer (not shown). The process may then be repeated again and again with different individual ones of micromirrors 24 being activated and/or deactivated such that different images are sequentially formed on imaging region 20 to produce a desired single or motion picture image. During this repetitive process, undesirable light 40a is reflected by heat shield sections 14 instead of being retained by array 12 and, therefore, may not result in heating of array 12.

The foregoing description of embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

We claim:

1. A display system, comprising:
    an array including:
        multiple, tiltably movable reflective devices;
        multiple immovable reflective regions each aligned along a projection axis with a corresponding space between ones of said movable reflective devices; and
        an electron beam that activates individual ones of said movable reflective devices between a first position and a second position, wherein in said first position light reflected from individual ones of said movable reflective devices is projected to a display surface and wherein in said second position light reflected from individual ones of said movable reflective devices is projected to a light dump.

2. The system of claim 1 wherein said immovable reflective regions reflect light toward a light dump.

3. The system of claim 1 wherein said immovable reflective regions are formed on said array by one of CVD and PVD processes.

4. The system of claim 1 wherein said array includes a substrate manufactured of glass.

5. The system of claim 1 wherein said array comprises a micromirror array.

6. The system of claim 1 further comprising:
    an activation device operable to move each of said reflective devices between a first position and a second position different from one another.

7. The system of claim 1 wherein said reflective regions are non-heat conductive.

8. The system of claim 1 wherein said reflective regions are structured to direct light projected to said reflective regions away from an imaging region.

9. The system of claim 1 wherein said reflective regions define a surface positioned at an angle in a range of zero to thirty five degrees with respect to said projection axis of said system.

10. A method of displaying light, comprising:
    projecting a light beam to a light modulating device;
    moving individual pixels of said light modulating device between first and second positions, wherein individual pixels in said first position reflect a portion of said light beam to a display region and individual pixels in said second position reflect a portion of said light beam to a light dump; and
    reflecting light from regions positioned between each of said individual pixels of said light modulating device to a light dump.

11. The method of claim 10 wherein said regions positioned between each of said individual pixels comprises individual surfaces each positioned at an angle in a range of zero to thirty five degrees with respect to a projection axis of said light beam.

12. A light display apparatus, comprising:
    means for reflecting a usable portion of a light beam to define an image, said means including a plurality of pivotally movable reflective devices; and
    means for reflecting an unused portion of said light beam, said means for reflecting said unused portion including a plurality of immovable reflective regions positioned between said plurality of pivotally movable reflective devices, wherein said immovable reflective regions reflect said unused portion of said light beam to a light dump.

13. The apparatus of claim 12 wherein said movable reflective devices are positioned on a substrate and wherein said means for reflecting an undesirable portion comprises reflective material deposited on said substrate.

14. A light display system, comprising:
    an electron beam generator that produces an electron beam;
    a light modulator including a plurality of micromirror devices moved by said electron beam and defining margins between each of said plurality of micromirror devices; and
    a reflective heat shield including heat shield sections each positioned in said margins of said light modulator, said heat shield sections each reflecting light impinging thereon as non-imaging light,
    wherein said light modulator comprises a glass substrate and wherein said heat shield sections include reflective material deposited on said glass substrate wherein a width of said heat shield sections measured parallel to a planar expanse of said substrate is greater than a height of said heat shield sections measured perpendicular to said planar expanse of said substrate.

15. The system of claim 14 wherein said micromirror devices are positioned in a vacuum envelope.

16. A method of manufacturing a light display system, comprising:

manufacturing an array on a substrate, said array including a plurality of tiltably movable mirrors that define an unreflective region between each of said plurality of movable mirrors; and manufacturing a plurality of reflective structures each positioned in individual ones of said unreflective regions, wherein said reflective structures are non-conducting and further comprising structuring said reflective structures such that light impinging thereon is reflected outwardly of said system as non-imaging light.

17. The method of claim 16 wherein said array and said plurality of reflective regions are formed on a glass substrate by a process chosen from at least one of CVD and PVD processes.

* * * * *

UNITED STATES PATENT AND TRADEMARK OFFICE
CERTIFICATE OF CORRECTION

PATENT NO. : 7,426,072 B2
APPLICATION NO. : 11/258541
DATED : September 16, 2008
INVENTOR(S) : George Radominski et al.

Page 1 of 1

It is certified that error appears in the above-identified patent and that said Letters Patent is hereby corrected as shown below:

On the Title Page Item (75), in "Inventors", in column 1, line 3, delete "Pullman, WA" and insert -- Moscow, ID --, therefor.

Signed and Sealed this

Thirtieth Day of December, 2008

JON W. DUDAS
*Director of the United States Patent and Trademark Office*